(12) United States Patent
Turk (10) Patent No.: US 7,568,602 B2
(45) Date of Patent: *Aug. 4, 2009

(54) FAN MOTOR SUSPENSION MOUNT FOR A COMBUSTION-POWERED TOOL

(75) Inventor: Robert L. Turk, Waukegan, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/514,627

(22) Filed: Sep. 1, 2006

(65) Prior Publication Data

US 2006/0289596 A1 Dec. 28, 2006

Related U.S. Application Data

(60) Division of application No. 10/800,902, filed on Mar. 15, 2004, now Pat. No. 7,118,018, which is a continuation of application No. 10/242,531, filed on Sep. 12, 2002, now Pat. No. 7,040,520.

(51) Int. Cl.
*B25C 1/14* (2006.01)
(52) U.S. Cl. .................. 227/10; 227/130; 227/156
(58) Field of Classification Search ............ 173/210, 173/211, 171; 227/10, 8, 9, 130, 156; 123/46 SC, 123/46 SS See application file for complete search history.

(56) References Cited

U.S. PATENT DOCUMENTS

| | | | | |
|---|---|---|---|---|
| 2,936,141 A | * | 5/1960 | Rapata | 248/604 |
| 2,953,177 A | | 9/1960 | Wandel et al. | |
| 3,065,941 A | * | 11/1962 | Loftis | 248/604 |
| 3,228,450 A | * | 1/1966 | McCullough | 431/28 |
| 3,244,105 A | * | 4/1966 | La Flame | 415/143 |
| 3,968,843 A | | 7/1976 | Shotwell | |
| 4,293,114 A | * | 10/1981 | Lykes | 248/604 |
| 4,403,722 A | * | 9/1983 | Nikolich | 227/8 |
| 4,483,473 A | | 11/1984 | Wagdy | |
| 4,483,474 A | | 11/1984 | Nikolich | |
| 4,522,162 A | | 6/1985 | Nikolich | |
| 4,568,243 A | * | 2/1986 | Schubert et al. | 415/213.1 |
| 4,597,453 A | | 7/1986 | Kilmer et al. | |
| 4,625,903 A | | 12/1986 | Becht | |
| RE32,452 E | | 7/1987 | Nikolich | |
| 4,768,925 A | * | 9/1988 | Geupel | 415/213.1 |
| 4,772,042 A | | 9/1988 | Jinsheng | |

(Continued)

FOREIGN PATENT DOCUMENTS

DE 199 06 585 8/1999

(Continued)

*Primary Examiner*—Paul R Durand
(74) *Attorney, Agent, or Firm*—Greer, Burns & Crain, Ltd.; Christopher P. Rauch; Mark W. Croll (57) ABSTRACT

A motor mount for suspending a fan motor in a combustion-powered tool includes an inner ring for securing to the motor, an outer ring that is secured to a portion of the tool, and a web portion disposed between and connecting the inner ring and outer ring. The inner ring, outer ring, and web portion are formed as a unitary piece. Preferably, the mount is formed of a thermoplastic polyester elastomer.

5 Claims, 7 Drawing Sheets

U.S. PATENT DOCUMENTS

| | | | |
|---|---|---|---|
| 4,974,819 A | 12/1990 | Reichard et al. | |
| 5,112,024 A * | 5/1992 | Stanko | 248/603 |
| 5,170,851 A | 12/1992 | Kress et al. | |
| 5,177,915 A | 1/1993 | Kobori et al. | |
| 5,187,400 A | 2/1993 | Kurata | |
| 5,197,646 A * | 3/1993 | Nikolich | 227/8 |
| 5,201,500 A | 4/1993 | Ecktman et al. | |
| 5,203,093 A * | 4/1993 | Baker | 34/601 |
| 5,207,143 A | 5/1993 | Monacelli | |
| 5,263,439 A | 11/1993 | Doherty et al. | |
| 5,320,268 A | 6/1994 | Shkolnikov et al. | |
| 5,521,447 A * | 5/1996 | Bertolini et al. | 310/51 |
| 5,530,304 A | 6/1996 | Mirumachi et al. | |
| 5,680,980 A | 10/1997 | Robinson | |
| 5,687,898 A | 11/1997 | Toulouse | |
| 5,709,233 A | 1/1998 | Boland et al. | |
| 5,713,313 A * | 2/1998 | Berry | 123/46 SC |
| 5,875,562 A * | 3/1999 | Fogarty | 34/97 |
| 5,952,766 A | 9/1999 | Mukohjima et al. | |
| 5,959,379 A * | 9/1999 | Hu et al. | 310/51 |
| 5,988,477 A * | 11/1999 | Deieso et al. | 227/130 |
| 6,045,112 A | 4/2000 | Kirkwood | |
| 6,171,079 B1 | 1/2001 | Gross et al. | |
| 6,250,397 B1 | 6/2001 | Hook et al. | |
| 6,262,504 B1 | 7/2001 | Bartlett | |
| 6,269,888 B1 | 8/2001 | Schuda et al. | |
| 6,339,267 B1 | 1/2002 | Fujii et al. | |
| 6,366,126 B1 | 4/2002 | Watari | |
| 6,375,171 B1 | 4/2002 | Zimmermann et al. | |
| 6,394,191 B1 | 5/2002 | Nakane | |
| 6,520,397 B1 | 2/2003 | Moeller | |
| 6,619,527 B1 * | 9/2003 | Moeller | 227/10 |

FOREIGN PATENT DOCUMENTS

| | | |
|---|---|---|
| EP | 0 925 880 | 6/1999 |
| EP | 1 197 300 | 4/2002 |

* cited by examiner

FAN MOTOR SUSPENSION MOUNT FOR A COMBUSTION-POWERED TOOL

REFERENCE TO RELATED APPLICATIONS AND PRIORITY CLAIM

This application is a divisional application of U.S. patent application Ser. No. 10/800,902, filed on Mar. 15, 2004, now U.S. Pat. No. 7,118,018 which is a continuation application of U.S. patent application Ser. No. 10/242,531, filed Sep. 12, 2002, now U.S. Pat. No. 7,040,520.

BACKGROUND OF THE INVENTION

The present invention relates generally to improvements in portable, combustion-powered fastener driving tools, and more particularly to a mount for a combustion chamber fan motor.

Portable, combustion-powered fastener driving tools are used for driving fasteners into workpieces. Exemplary embodiments of fastener driving tools are described in U.S. Pat. Nos. 4,522,162; 4,483,473; 4,483,474; 4,403,722; 5,197,646; 5,263,439; and Re. 32,452, all of which are incorporated by reference herein. Particular embodiments of fastener driving tools are sold, for example, by Illinois Tool Works of Vernon Hills, Ill., under the IMPULSE® and TRIMMASTER® brands.

Tools of the type noted above typically incorporate a generally pistol-shaped tool housing enclosing a small internal combustion engine. The engine is powered by a canister of pressurized fuel gas, also called a fuel cell. A battery-powered electronic power distribution unit produces the spark for ignition, and a fan located in the combustion chamber provides an efficient combustion within the chamber and facilitates scavenging, including the exhaust of combustion by-products. The engine includes a reciprocating piston with an elongated, rigid driver blade disposed within a cylinder body.

A valve sleeve is axially reciprocable about the cylinder and, through a linkage, moves to close the combustion chamber when a work contact element at the end of the linkage is pressed against a workpiece. This pressing action also triggers a fuel metering valve to introduce a specified volume of fuel into the closed combustion chamber.

Upon the pulling of a trigger switch, which causes the ignition of a charge of gas in the combustion chamber of the engine, the piston and driver blade are shot downward to impact a positioned fastener and drive it into the workpiece. The piston then returns to its original or "ready" position through differential gas pressures within the cylinder. Fasteners are fed magazine-style into the nosepiece, where they are held in a properly positioned orientation for receiving the impact of the driver blade.

Upon ignition of the combustible fuel/air mixture, the combustion in the chamber causes the acceleration of the piston/driver blade assembly and the penetration of the fastener into the workpiece if the fastener is present. This combined downward movement causes a reactive force or recoil of the tool body. Hence, the fan motor, which is suspended in the tool body, is subjected to acceleration in a direction opposite the power stroke of the piston/driver blade and fastener.

Then, within milliseconds, the momentum of the piston/driver blade assembly is stopped by the bumper at the opposite end of the cylinder, and the tool body is accelerated toward the workpiece. Therefore, the fan motor and shaft are subjected to an acceleration force that is opposite the direction of the first acceleration. These reciprocal accelerations cause the fan motor to oscillate with respect to the tool. The magnitude of these accelerations, if left unmanaged, is detrimental to the life and reliability of the combustion chamber fan motor.

Recent portable, combustion-powered fastener driving tools address the problems of motor acceleration and oscillation by including a suspension mechanism that suspends the fan motor within a cavity of the cylinder head. The suspension mechanism reduces the effects of the reciprocal axial accelerations and the resulting oscillation of the motor during operation of the tool, and allows the use of a standard, iron-core motor in the tool. Before such suspension mechanisms, specially designed motors were required in the tools to withstand the reciprocal accelerations, resulting in increased production costs.

Exemplary embodiments of such recent suspension mechanisms are described in commonly assigned EP 1 197 300 and EP 0 925 880, the entireties of which are incorporated herein by reference. The type of suspension mechanism described in EP '300 and EP '880 suspends the motor, for example, within a depending cavity in the center of a cylinder head. The suspension mechanisms include a flexible rubber web, which may be vulcanized or bonded to a retaining mechanism securing the fan motor, such as a retaining ring or cup. The web is also vulcanized or bonded to a mechanism such as a steel mounting bracket or steel ring, radially spaced from the retaining ring and secured to the cylinder head. Only the resilient web secures the retaining mechanism holding the motor to the cylinder head. The rubber web may be provided with a number of preferably blind end bores.

These and similar types of suspension mechanisms reduce or dampen operationally-induced reciprocal accelerations of the motor while keeping the oscillations of the motor within an acceptable range, thus extending the life of the motor. Because a standard motor can be used in a portable tool having the suspension mechanisms, production costs of the tool can be reduced.

However, it has been difficult and costly to produce the present suspension mechanism, due to, among other things, the costs of stamping the rubber web and vulcanizing or bonding the rubber web. Due to continuing commercial pressure on manufacturers to lower prices, there is a need to provide a combustion chamber fan motor suspension which substantially provides the benefits of prior art suspensions at a reduced manufacturing cost.

SUMMARY OF THE INVENTION

The present invention provides a mount for a fan motor suspension mechanism of a combustion-powered tool. The tool is of the type that generates an upward axial acceleration of the motor upon a combustion in the chamber and a subsequent reciprocal axial acceleration of the motor, where at least one of the accelerations causes the motor to oscillate relative to the tool. The suspension mechanism includes a mount having a inner ring configured to be secured to the motor, an outer ring configured to be secured to a portion of the tool, and a web radially disposed between and connecting the inner and outer ring. The inner ring, outer ring, and web of the mount are a unitary piece.

Preferably, the web of the mount includes at least one corrugation for improving or tailoring resilience of the web. The web may also be separated into at least two sections by one or more gaps. Also, it is preferred that the mount is formed from a thermoplastic polyester elastomer, such as HYTREL® elastomer made by E.I. DuPont de Nemours and Company of Wilmington, Del.

In a preferred embodiment of the invention, the tool includes a cylinder head that defines at least a part of the combustion chamber, and the outer ring of the mount is secured to the cylinder head by a retaining ring. The inner ring is secured to the motor by a pair of retaining rings, and suspended at least partially into a cavity of the cylinder head.

DETAILED DESCRIPTION OF THE INVENTION

Figure 1:
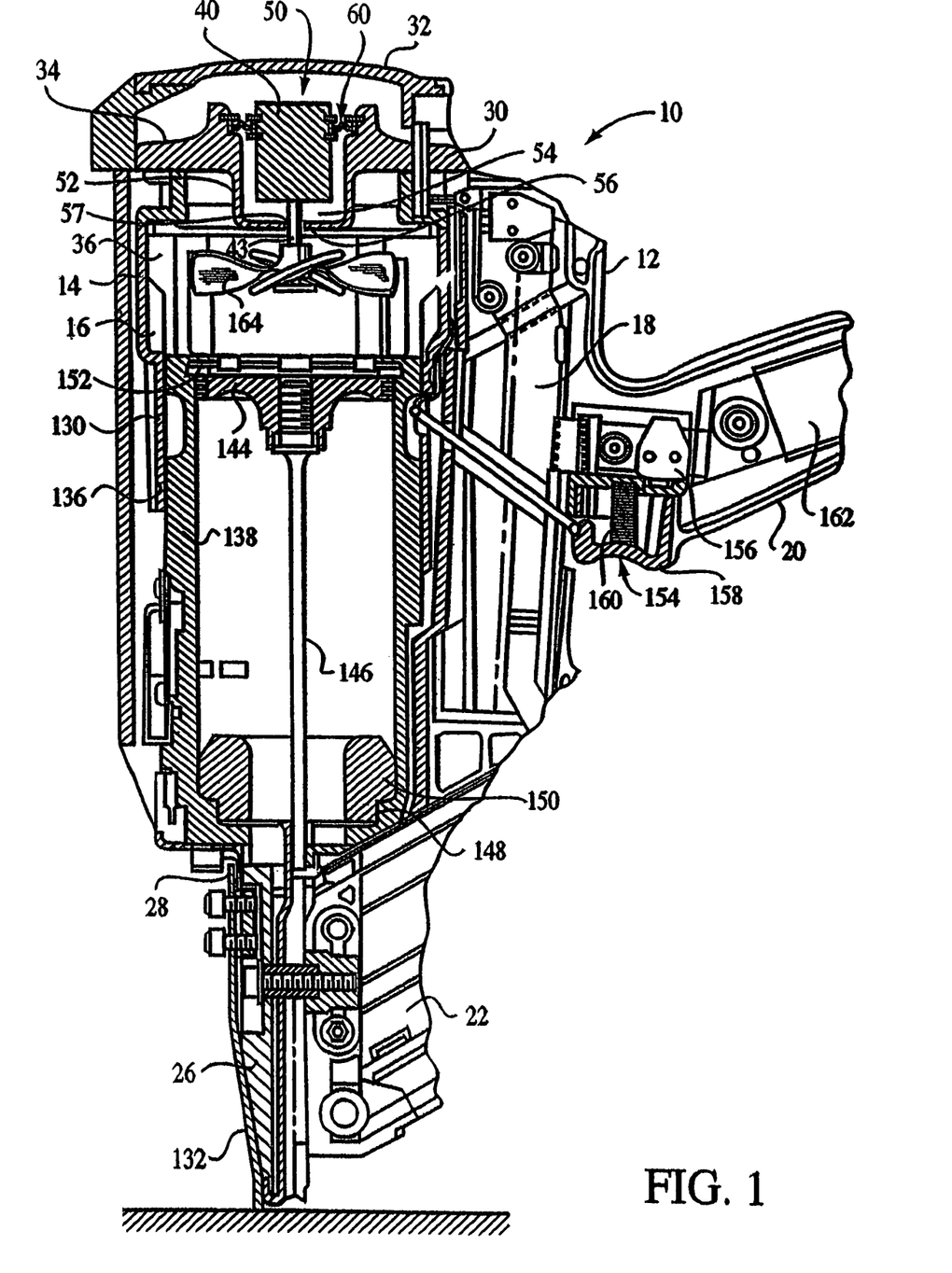
FIG. 1 is a fragmentary side view of a combustion powered fastener tool in accordance with an embodiment of the present invention, the tool being partially cut away and in vertical section for purposes of clarity.

Referring now to FIG. 1, a combustion-powered tool of the type suitable for use with the present invention is generally designated 10. While one type of combustion-powered tool is depicted here, it is contemplated that other tool configurations and arrangements of components may be provided that are suitable for use with the present suspension. The tool 10 has a housing 12 including a main power source chamber 14 dimensioned to enclose a self-contained internal combustion power source 16, a fuel cell chamber 18 generally parallel with and adjacent to the main chamber 14, and a handle portion 20 extending from one side of the fuel cell chamber and opposite the main chamber.

In addition, a fastener magazine 22 is positioned to extend generally parallel to the handle portion 20 from an engagement point with a nosepiece 26 depending from a lower end 28 of the main chamber 14. A battery (not shown) is provided for supplying electrical power to the tool 10, and is releasably housed in a compartment (not shown) located on the opposite side of the housing 12 from the fastener magazine 22. Opposite the lower end 28 of the main chamber is an upper end 30. A cap 32 covers the upper end 30 and is releasably fastened to the housing 12 to protect the fan motor and spark plug. As used herein, "lower" and "upper" are used to refer to the tool 10 in its operation orientation as depicted in FIG. 1; however, it will be understood that this invention may be used in a variety of orientations depending on the application.

A mechanically linked fuel metering valve (not shown) such as that shown in U.S. Pat. No. 4,483,474 may be used. Alternatively, an electromagnetic, solenoid type fuel metering valve (not shown) or an injector valve of the type described in commonly assigned U.S. Pat. No. 5,263,439 is provided to introduce fuel into the combustion chamber as is known in the art. A pressurized liquid hydrocarbon fuel, such as MAPP, is contained within a fuel cell located in the fuel cell chamber 18 and pressurized by a propellant as is known in the art.

Figure 2:
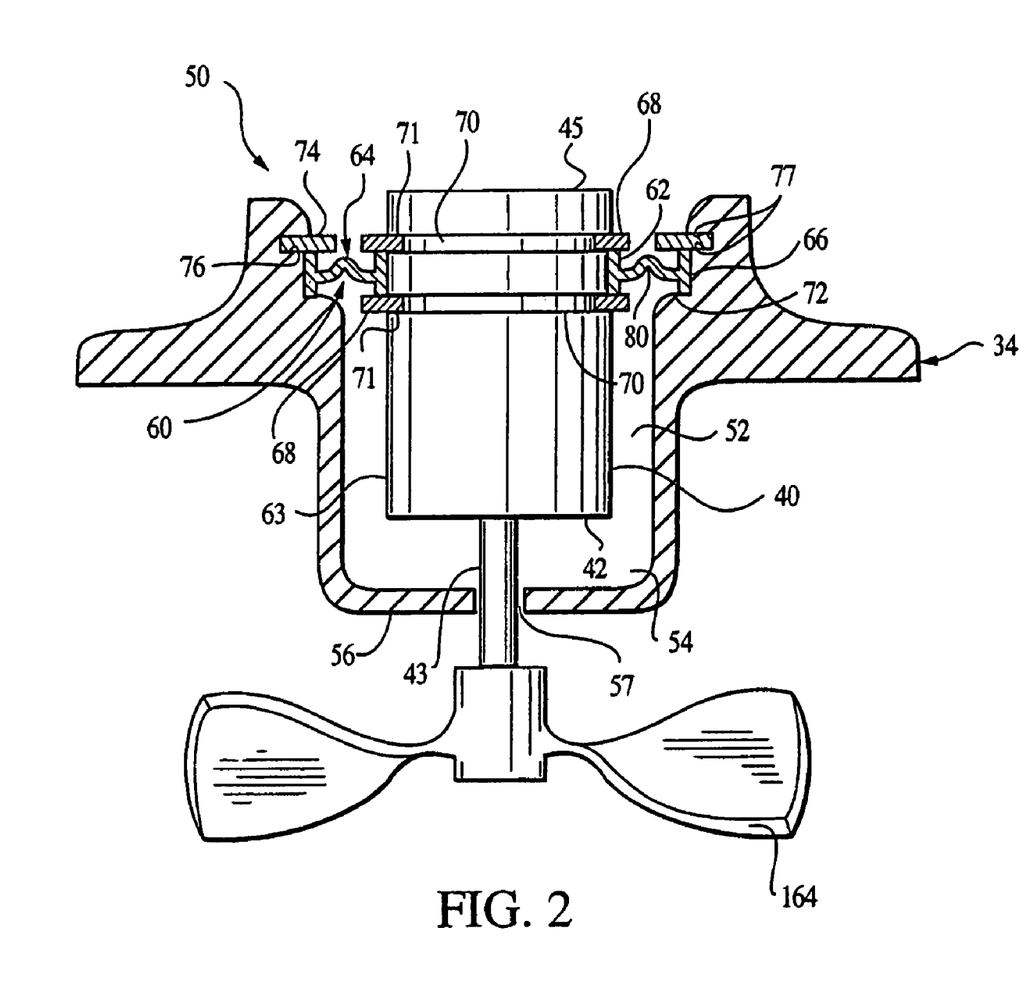
FIG. 2 is a vertical cross-section of a cylinder head and suspension mechanism according to an embodiment of the present invention, including a first embodiment of the present motor mount.

Referring now to FIGS. 1 and 2, a cylinder head 34, disposed at the upper end 30 of the main chamber, defines an upper end of a combustion chamber 36, and provides a spark plug port (not shown) for a spark plug (not shown), an electric fan motor 40, and a sealing O-ring (not shown). In the present invention, the fan motor 40 is a conventional iron core motor, also known as permanent magnet, brushed DC motor of the type produced by Nidec Copal of Tokyo, Japan, Canon of Japan, as well as may other known motor manufacturers. The motor 40 has an armature shaft end 42 with an armature (not shown) and an armature shaft 43, and a brush end 45 opposite the armature shaft end.

The fan motor 40 is slidingly suspended by a fan motor suspension mechanism, generally designated 50, within a depending cavity 52 in the center of the cylinder head 34 that allows for some longitudinal movement of the motor. As shown in FIG. 2, the motor 40 is preferably retained in the cavity 52 so that an air gap 54 is created between the lower or armature shaft end 42 of the motor and a floor 56 of the cavity 52. The function of the air gap 54 is to provide clearance for the motor during oscillations occurring in the course of operation. Preferably, the armature shaft 43 extends through a hole 57 of the floor 56.

As further shown in FIG. 2, the suspension mechanism 50 includes a motor mount, generally designated 60, having an inner, annular ring 62, a central, resilient web portion (web) 64, and an outer, annular ring 66. The inner ring 62 is configured to contact and secure the fan motor 40 at a sidewall 63 of the motor, preferably at a portion of the motor longitudinally closer to the brush end 45 than to the armature shaft end 42. For securing the inner ring 62 to the motor 40, two inner retaining rings 68, such as snap rings, preferably are disposed at least partially around the sidewall 63 of the motor and axially surround the inner ring. The inner retaining rings 68 preferably are received into a pair of corresponding grooves 70 formed into the sidewall 63, the grooves having inner walls 71 configured for axially constraining the retaining rings. Thus, the inner ring 62 is sandwiched or axially constrained by the retaining rings 68, and provides an attachment point for the motor 40.

The outer ring 66 of the mount 60 is secured to a portion of the tool 10, and preferably, the cylinder head 34. In the exemplary embodiment shown in FIG. 2, the outer ring 66 is retained against an integral portion or annular shoulder 72 of the cylinder head 34. Another restraining member or retaining ring 74, such as a snap ring having a larger diameter than the pair of retaining rings 68, secures the outer ring to the cylinder head 34. The retaining ring 74 is disposed over the outer ring 66 and, when secured, is received into a groove 76 formed into the cylinder head and disposed above the shoulder 72, so that it is axially constrained by inner walls 77 of the groove. Thus, the outer ring 66 is axially secured between the shoulder 72 and the retaining ring 74.

The web 64 extends radially between the inner ring 62 and the outer ring 66, connecting the inner ring to the outer ring. To allow a degree of axial movement by the motor 40, the web 64 is shaped to have one or more corrugations, folds, or bellows 80. Though corrugations 80 are described herein as a preferred structure of the web, it will be understood that folds, bellows or similar shapes may be used. Preferably, the corrugations 80 extend axially to one or more peaks 82 that do not go beyond the axial outer surfaces of the inner ring 62 and the outer ring 66, so that the corrugations 80 (including the peaks 82) are recessed in relation to the outer surfaces of the inner ring 62 and the outer ring 66. The corrugations 80 provide resilience to the web 64, and thus shock absorption for the motor 40.

Figure 3:
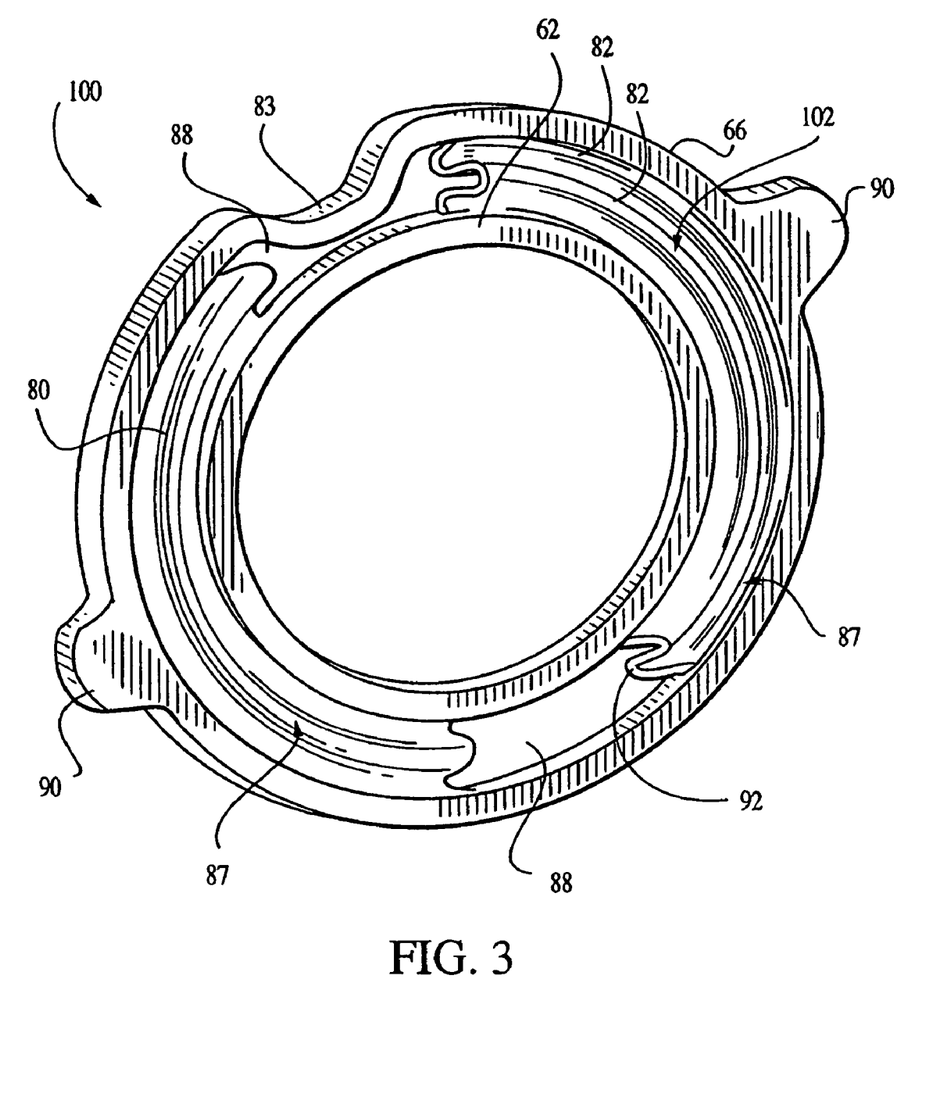
FIG. 3 is a perspective view of a second embodiment of a motor mount.

FIG. 3 illustrates a second embodiment of a motor mount 100 having a web 102 with a different configuration than the motor mount 60 shown in FIGS. 1-2. The outer ring 66 contains a recess 83 to allow space for the spark plug (not shown) disposed within the cylinder head 34. As shown in FIG. 3, however, the outer ring 66 preferably is continuous, as is the inner ring 62. This helps maintain a constant axial alignment of the motor 40 within the cavity 52, reducing misalignment between the armature shaft 43 and the hole 57 of the cavity. The web 102 in the motor mount 100 is separated into two discontinuous portions 87 by a pair of gaps 88 defined by the web. One of the gaps 88 is disposed radially inwardly of the recess 82 to provide clearance for the recess. In the preferred embodiment, the gaps 88 are disposed diametrically opposite to one another to balance the reciprocating axial movement of the motor 40. A pair of keys 90 formed onto and extending radially outwardly from the outer ring 66 is provided for fitting into a complementary set of recesses (not shown) within the cylinder head 34 near the shoulder 72. It is contemplated that the number and configuration of the keys 90 may vary to suit the application. Also, it is contemplated that the keys 90 are recesses and the cylinder head 34 has a mating key formation. The keys 90 significantly reduce, if not eliminate, rotation of the mount 60 within the cylinder head 34.

A feature of the mount 60, 100 is that it is formed in a unitary piece, as opposed to prior art suspension mechanisms having a separate rubber web vulcanized or adhered to metal rings or brackets. Additionally, the mount 60 is preferably formed from a thermoplastic polyester elastomer, such as HYTREL® elastomer, manufactured by E.I. DuPont de Nemours and Company of Wilmington, Del. The present inventor has discovered that the mount 60, 100 formed from HYTREL® elastomer provides a desired amount of resilience for absorbing or dampening acceleration of the motor 40, while being significantly less expensive to produce and customize than prior suspensions. The mount 60, 100 may also be configured for use with existing combustion tools, replacing metal/rubber motor mounts in suspension mechanisms.

The suspension mechanism 50 should be tuned so that, in operation, the motor 40 does not oscillate excessively with respect to the tool 10 and either bottom out or top out. By "tuned" it is meant that the resilience of the motor mount 60, 100 of the suspension mechanism 50 is adjusted to prevent a particular motor from excessive oscillation within predetermined, application-specific limits, depending on the combustion-induced force generated by the particular power source 16. As will be appreciated by those in the art, if the mount 60, 100 is manufactured of HYTREL® elastomer or other thermoplastic polyester elastomer, it may be molded or otherwise formed into customized shapes, dimensions, etc. for optimizing a tool or for retrofitting.

Parameters that may be easily varied for tuning the mount 60, 100 according to the present invention include the shape of the web 64, 102, the number and height of corrugations, folders, or bellows 80 of the web, the thickness of the web or the rings 62, 66, and the number, size, and shape of the gaps 88, between portions of the web (and consequently, the number of the portions 87 of the web). Using HYTREL® elastomer or similar material to construct the mount 60, 100 allows easy design and production of mounts varying in one or more of these parameters.

Figure 4:
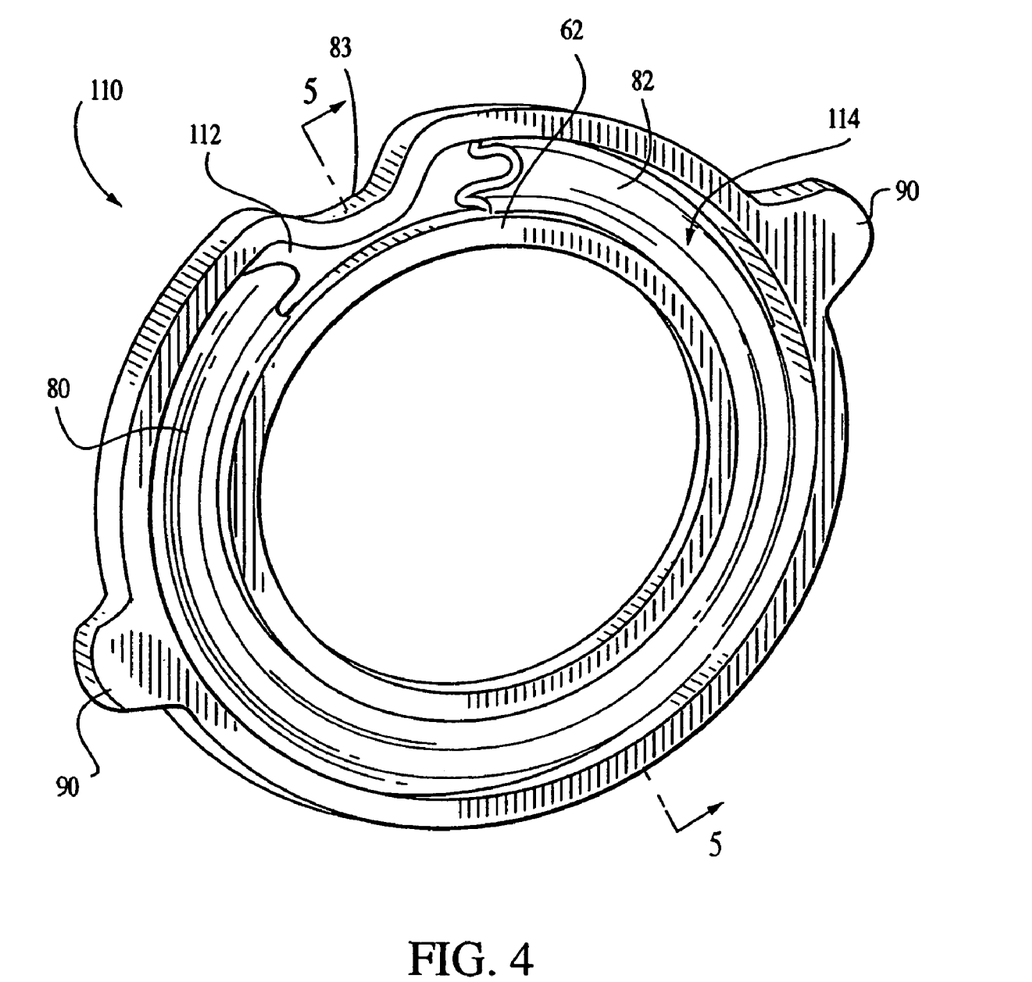
FIG. 4 is a perspective view of a third embodiment of a motor mount.
Figure 5:
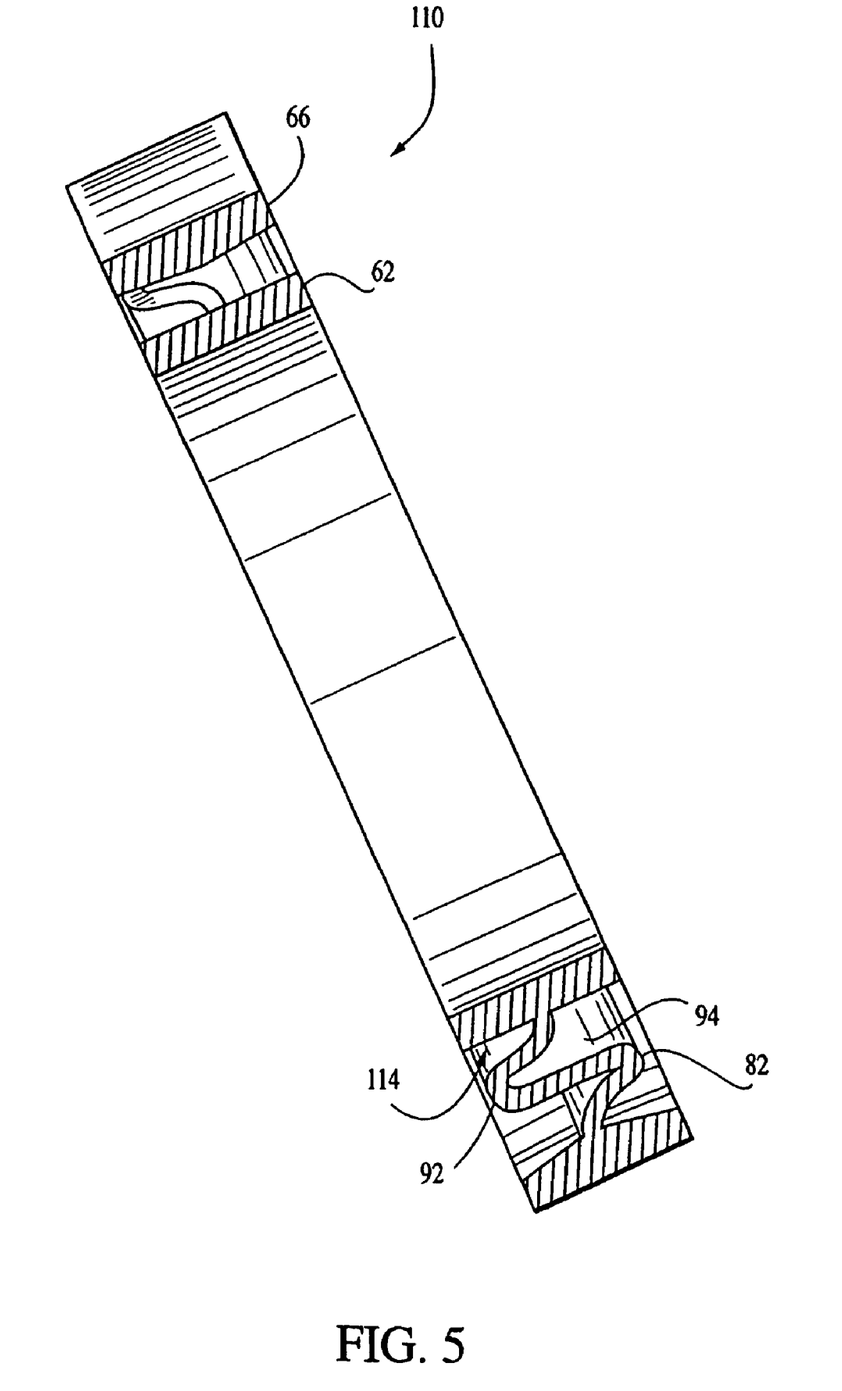
FIG. 5 is a cross-sectional view of the third embodiment motor mount taken along line 5-5 of FIG. 4 and in the direction generally indicated.
Figure 6:
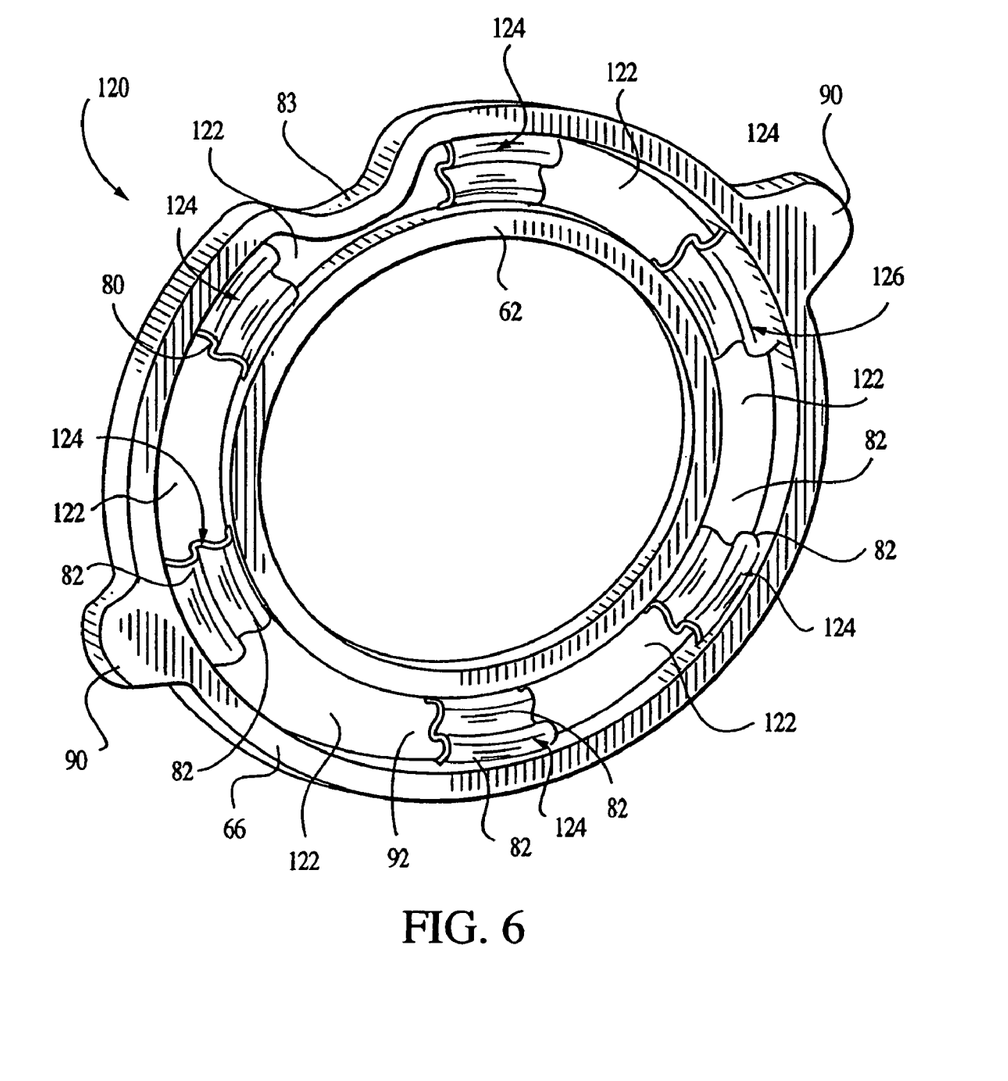
FIG. 6 is a perspective view of a fourth embodiment of a motor mount.
Figure 7:
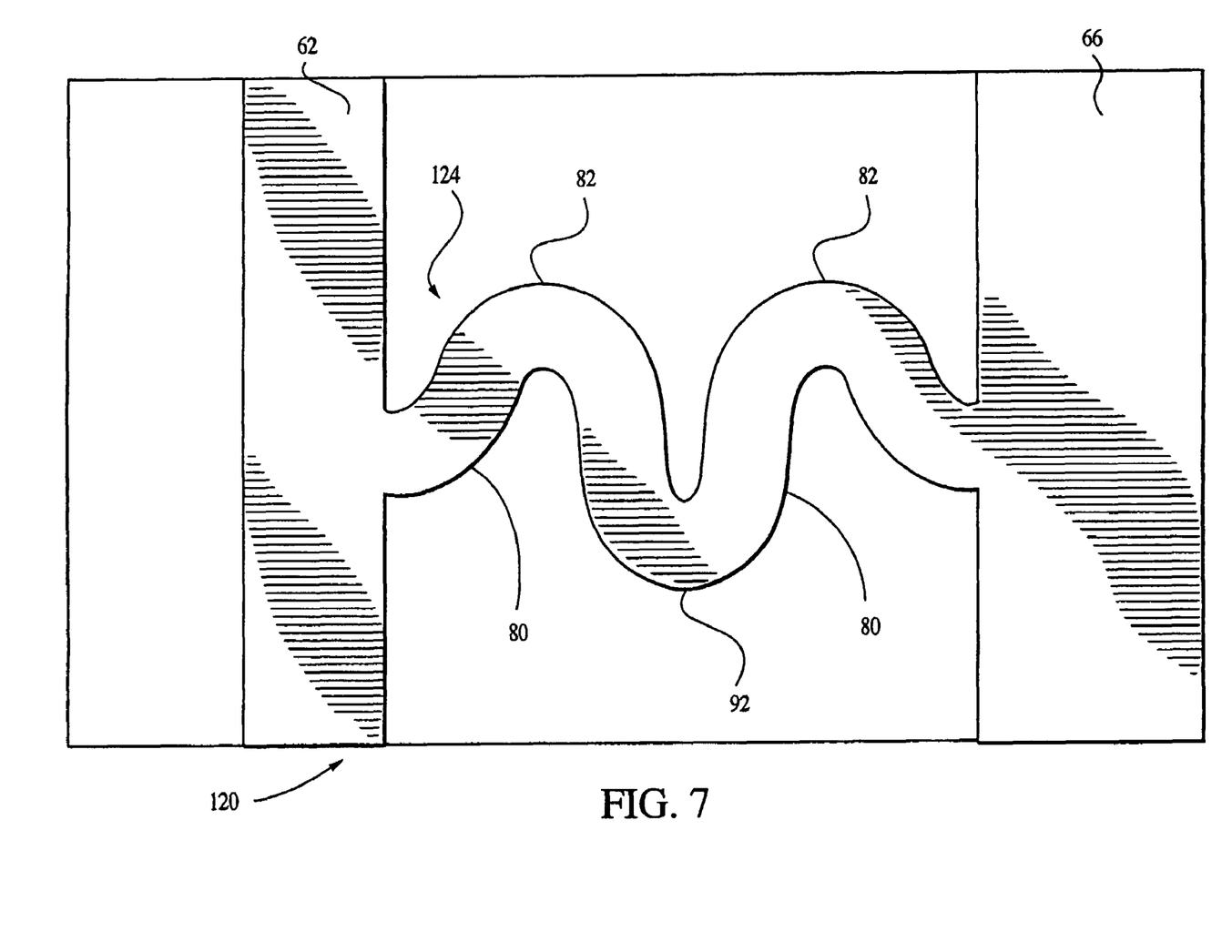
FIG. 7 is a cross-sectional view of the corrugation from the motor mount of FIG. 6.

For example, FIGS. 4 and 5 depict a third embodiment motor mount 110 having a single gap 112 and a web 114. FIGS. 6 and 7 depict a fourth embodiment motor mount 120 having six gaps 122 and six sections 124, with a web 126. A comparison of FIGS. 5 and 7 also shows an example of varying shapes between the web 114 and the web 126. For example, FIG. 5 illustrates that the web 114 has wave-like corrugations 80 in cross-section having an upper peak 82 and a lower dip 92 (as shown in the orientation of FIG. 5) separated by a relatively straight drop 94. This configuration allows less restrictive travel by the motor 40. FIG. 7, by contrast, shows the web 126 having a generally M-shaped, sinusoidal cross-section, having a pair of the corrugations 80 with two peaks 82 (as shown in the orientation of FIG. 7). The web shown in FIG. 2, furthermore, includes a single corrugation 80. One skilled in the art will appreciate that a significant number of embodiments are possible for the mount 60, 100, 110, 120 by varying the parameters listed above and other parameters known to those of ordinary skill in the art, and that all of these are contemplated by the present invention.

Referring again to FIG. 1, the generally cylindrical combustion chamber 36 opens and closes by sliding motion valve member 130, which is moved within the main chamber 14 by a workpiece contacting element 132 on the nosepiece 26 using a linkage in a known manner. The valve member 130 serves as a gas control device in the combustion chamber, and sidewalls of the combustion chamber are defined by the valve member 130, the upper end of which sealingly engages the O-ring (not shown) to seal the upper end of the combustion chamber. A lower portion 136 of the valve member 130 circumscribes a generally cylindrical body or cylinder 138. An upper end of the cylindrical body 138 is provided with an exterior O-ring (not shown) which engages a corresponding portion of the valve member 130 to seal a lower end of the combustion chamber 36.

Within the cylinder body 138 is a reciprocally disposed piston 144 to which is attached a rigid, elongate driver blade 146 used to drive fasteners (not shown), suitably positioned in the nosepiece 26, into a workpiece (not shown). A lower end of the cylinder body defines a seat 148 for a bumper 150 which defines the lower limit of travel of the piston 144. At the opposite end of the cylinder body 138, a piston stop retaining ring 152 is affixed to limit the upward travel of the piston 144.

Located in the handle portion 20 of the housing 12 are the controls for operating the tool 10. A trigger switch assembly 154 includes a trigger switch 156, a trigger 158, and a biased trigger return member 160. An ECU 162 under the control of the trigger switch 156 activates the spark plug (not shown).

In operation, as the trigger 158 is pulled, a signal is generated from the ECU 160 to cause a discharge at the spark gap of the spark plug 38, which ignites the fuel that has been injected into the combustion chamber 36 and vaporized or fragmented by a fan 164. The fan 164 is driven by the armature shaft 43, and is located within the combustion chamber 36 to enhance the combustion process and to facilitate cooling and scavenging. The fan motor 40 is preferably controlled by a head switch and/or the trigger switch 156, as disclosed in more detail in the prior patents incorporated by reference.

The ignition forces the piston 144 and the driver blade 146 down the cylinder body 138 until the driver blade contacts a fastener and drives it into the substrate as is well known in the art. The piston then returns to its original or "ready" position through differential gas pressures within the cylinder, which are maintained in part by the sealed condition of the combustion chamber 36.

The fan motor 40 experiences two primary accelerations during this cycle. First, when the ignition of combustible gases in the chamber 36 forces the piston 144 downwardly toward the workpiece, and preferably forces a fastener into the workpiece, the tool 10 experiences an opposing upward force, or a recoil force, in the opposite direction. The fan motor 40, which is suspended by the suspension mechanism 50 in the tool 10, is accelerated upwardly in the direction of the recoil of the tool by a force transmitted through the suspension mechanism. Furthermore, the armature shaft 43 is accelerated in the same direction by having constrained movement relative to the motor 40 within limits of axial play. Then, in less than approximately ten milliseconds, the piston 144 bottoms-out in the cylinder against the bumper 150. This action changes the acceleration of the tool 10 towards the workpiece. Therefore, the motor and shaft are now accelerated in this new, opposite direction. The suspension mechanism 50 and the motor mount 60, 100, 110, 120 of the present invention provide a shock absorbing and isolating system to minimize the operational dynamics of the main chamber 14 caused by the combustion on the motor 40 and also to protect the motor from axial acceleration and large oscillations.

The motor mount 60, 100, 110,120 suspendingly supports the motor 40 and decreases acceleration of the motor resulting from the combustion during operation. The motor mount 60, 100, 110, 120 also (preferably when properly tuned) dampens oscillation and dynamically operates without detrimental contact within the positive constraints of the tool 10 (bottoming or topping out). The motor mount 60, 100, 110, 120 anticipates the two opposite accelerations separated by a predetermined fairly repeatable time and resiliently constrains the motor 40, preferably within the bounds of the cavity 52, to minimize the acceleration force of "g's" witnessed by the motor. The motor 40 need not be custom designed to provide for the acceleration forces generated by the tool 10. Instead, with the suspension mechanism 50 able to absorb the acceleration and dampen the oscillation, a less expensive motor may be provided, which reduces the overall manufacturing cost of the tool without impairing performance.

One skilled in the art will appreciate that the motor mount 60, 100, 110, 120 can be designed and/or tuned using variations as described above, and as shown by example in FIGS. 1-7, to optimize the support and dampening characteristics of the mount for the motor 40.

The present invention thus provides a motor mount for a suspension mechanism of a portable combustion-powered tool that preferably is inexpensively made, is easily tuned, and may be retrofitted into some existing tools, including tools having standard motors. The inventive mount provides benefits of previous steel/rubber suspension mechanisms at a lower cost.

While particular embodiments of the present mount for combustion-powered tool of the invention has been shown and described, it will be appreciated by those skilled in the art that changes and modifications may be made thereto without departing from the invention in its broader aspects and as set forth in the following claims.

The invention claimed is:

1. A suspension system for a fan motor of a combustion chamber in a combustion-powered tool for driving a fastener into a workpiece, the fan motor disposed within a cylinder head, the tool generating an acceleration of the fan motor in an axial direction away from the workpiece upon a combustion in the chamber and a subsequent reciprocal axial acceleration of the fan motor, at least one of the accelerations causing the fan motor to oscillate relative to the tool, the system comprising:

an elastic member disposed within the tool and in direct contact with the motor, said elastic member being disposed relative to the motor to directly receive and absorb force along the axial direction to counteract and dampen the acceleration; and a restraining member disposed within the tool, said restraining member being mounted to the cylinder head of the tool within a cavity defined in said cylinder head for accommodating the fan motor and disposed in a groove defined by the cylinder head relative to said elastic member to secure said elastic member relative to the cylinder head, thereby resisting upward bias of said elastic member in response to the acceleration of the fan motor;

wherein the motor is restrained against upward movement by engagement via said elastic member, which in turn is restrained by said restraining member.

2. The suspension system of claim 1 wherein said cavity has a floor and an inner cylindrical sidewall disposed above the floor;

wherein a sidewall of the motor is disposed at least partially within the cavity such that a lower end of the sidewall of the motor is disposed above and spaced from the floor;

wherein the suspension mechanism is secured to said sidewall and suspends the motor at least partially within the cavity; and wherein a cylindrical gap is defined between the sidewall of the motor disposed within the cavity and the inner cylindrical sidewall.

3. A suspension system for a fan motor of a combustion chamber in a combustion-powered tool for driving a fastener into a workpiece, the fan motor disposed within a cylinder head, the tool generating an acceleration of the fan motor in an axial direction away from the workpiece upon a combustion in the chamber and a subsequent reciprocal axial acceleration of the fan motor, at least one of the accelerations causing the fan motor to oscillate relative to the tool, the system comprising:

an elastic member disposed within the tool and in direct contact with the motor, said elastic member being disposed relative to the motor to directly receive and absorb force along the axial direction to counteract and dampen the acceleration; and a restraining member mounted to the cylinder head of the tool and disposed relative to said elastic member to secure said elastic member relative to the cylinder head, thereby resisting upward bias of said elastic member in response to the acceleration of the fan motor;

wherein the cylinder head includes an integral portion disposed above said restraining member, said integral portion defining a groove wherein at least a portion of said restraining member engages said groove such that the cylinder head acts to at least axially restrain said restraining member.

4. The suspension system of claim 3 wherein the suspension mechanism regulates movement of the motor within the cylinder head.

5. The suspension system of claim 3 wherein said restraining member comprises a C-clip.

* * * * *